Oct. 16, 1962   C. D. NUGENT   3,058,592
LIQUID FILTER
Filed June 24, 1958   2 Sheets-Sheet 1

INVENTOR.
Corliss D. Nugent
BY
Parker & Carter
Attorneys

Oct. 16, 1962
C. D. NUGENT
3,058,592
LIQUID FILTER
Filed June 24, 1958
2 Sheets-Sheet 2
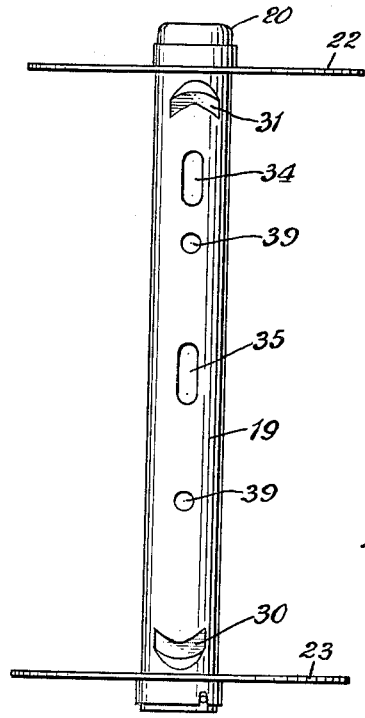
Fig.3
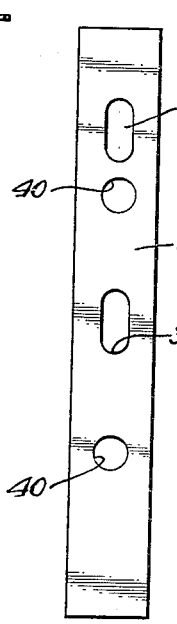
Fig.4
Fig.5
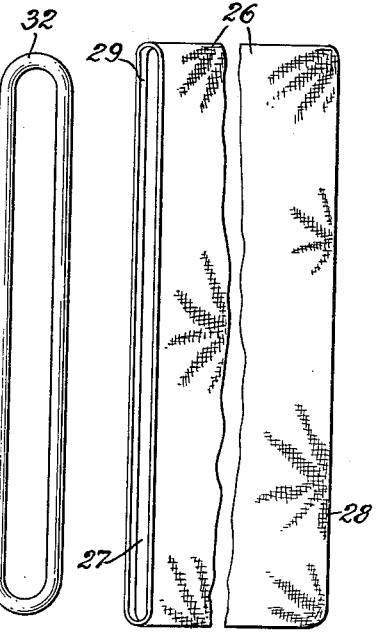
Fig.6
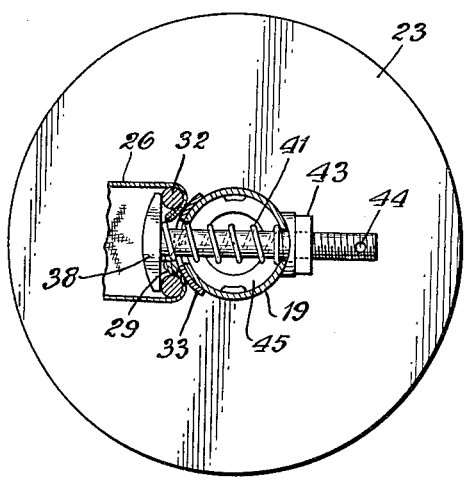
Fig.8
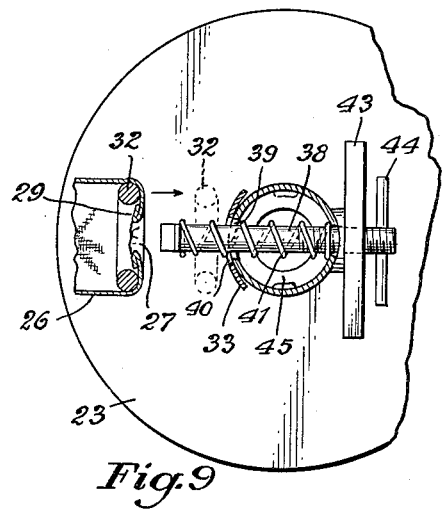
Fig.9
INVENTOR.
Corliss D. Nugent
BY
Parker & Carter
Attorneys United States Patent Office 3,058,592
Patented Oct. 16, 1962

3,058,592
LIQUID FILTER
Corliss D. Nugent, 3440 Cleveland St., Skokie, Ill.
Filed June 24, 1958, Ser. No. 744,138
3 Claims. (Cl. 210—232)

My invention relates to improvements in filters and has for one object to provide a filter for filtering such things as engine lubricants and the like wherein filtering of the fluid under pressure may be effectively accomplished in a device of small compass which is easily renewed and cleaned.

In general, the liquid to be filtered is discharged into the interior of a bag of substantial length wound about the spool, passes through the meshes of the fabric bag leaving the sediment or sludge in the bag with the filtered fluid passing from the bag through the housing outside the bag and then passing out in filtered condition for reuse. The convolutions of the bag wound about the spool or mantle are kept apart by a separating mat so that both sides of the bag are free and unobstructed to permit discharge of the liquid.

When the filter needs replacing all that is necessary is to remove the housing from its working position, withdraw the assembled spool bag and mat, remove the bag, throw it away or clean it as the case may be and refresh it with a fresh bag.

It is of the utmost importance that there be no leakage between the bag which is open ended at one end only and the point where the bag contacts the spool at its open end. It is also important that the bag be protected against excess pressures and as pressure builds up, the bag becoming more and more filled with sludge, the pressure resistance of the bag gradually reaches the danger point. If the operator fails to renew the bag, pressure release means are provided so that while dirty fluid may now escape, the bag will not break and discharge an excessive amount of refuse therefrom into the system. It is important that the apparatus be light, compact, easily manufactured, easily assembled and be accurate in operation. The present device is an improvement based on experience had with the device of Patent No. 1,919,034.

Other objects will appear from time to time throughout the specification and claims.

My invention is illustrated more or less diagrammatically in the accompanying drawings, wherein:

FIGURE 3 is a side elevation similar to FIGURE 2 angularly displaced through ninety degrees;

FIGURE 4 is a plan view of the gasket;

FIGURE 5 is a plan view of the gasket setting ring;

FIGURE 6 is a perspective of a part broken away of the filter bag;

FIGURE 8 is a section with parts omitted along the line 8—8 of FIGURE 1;

FIGURE 9 is an exploded section similar to FIGURE 8 showing the parts in partially assembled position.

Like parts are indicated by like characters throughout the specification and drawings.

Figures 1, 2, 7:
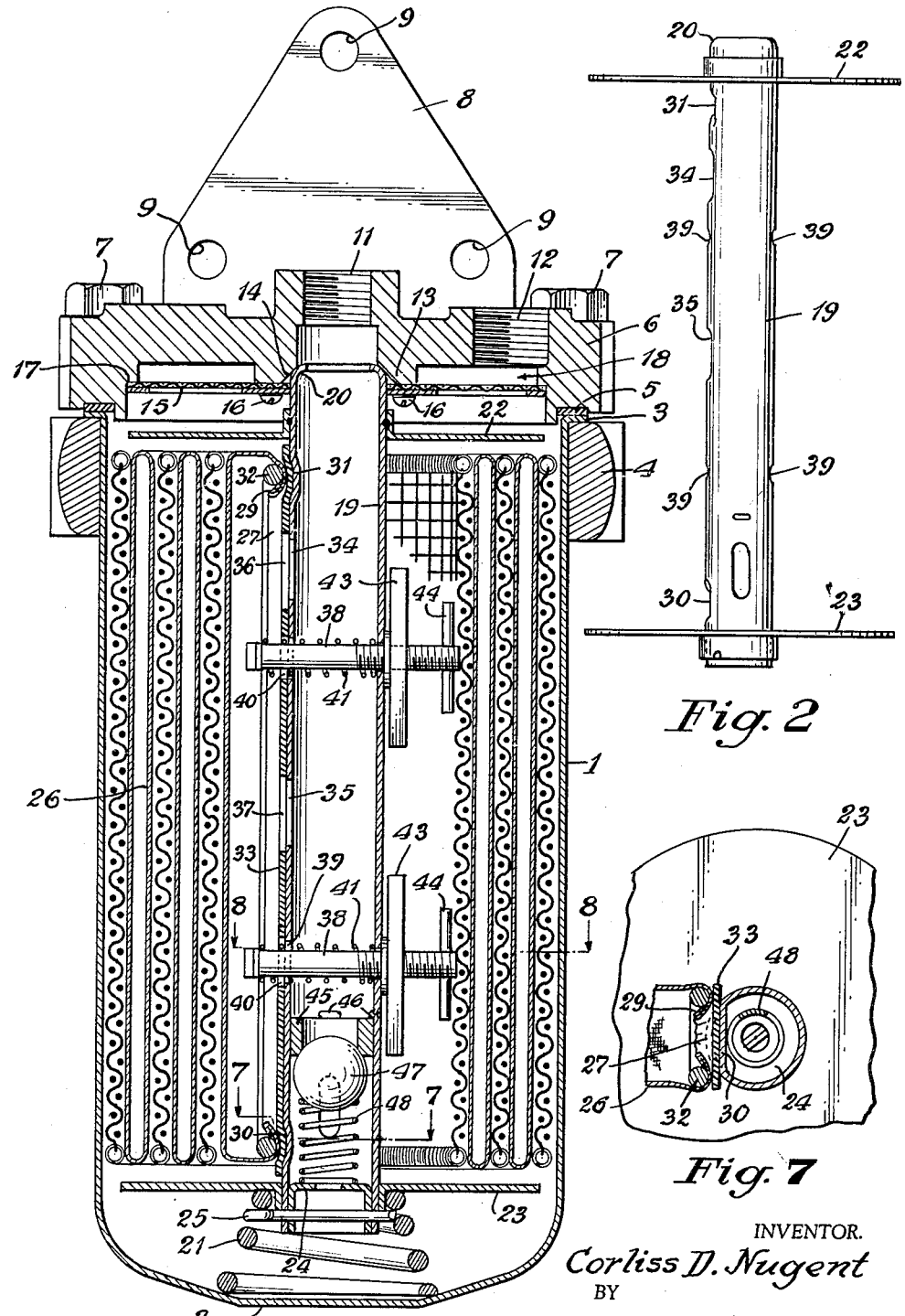
FIGURE 1 is a vertical section through the filter.
FIGURE 2 is a side elevation through the central filter supporting spool.
FIGURE 7 is a section along the line 7—7 of FIGURE 1.

The metal housing or can 1 is closed at its lower end, the lower end being flat as at 2. The upper end of the can is outwardly flanged about its entire outer periphery at 3. A yoke 4 encircles the upper end of the can and supports the flange 3. A packing washer 5 is interposed between the flange 3 and the fixed base 6. Screws 7 threaded in the yoke 4 pass through the base 6 and may be tightened to clamp and rigidly hold the can 1 in position, compressing the packing ring 5 so that there will be no leakage about the upper end of the can.

A bracket 8 supports the base 6 in fixed position through the bolt holes 9, the bolts not being shown. The piping to and from the can is not illustrated, forming no part of the present invention but the intake pipe will be threaded in the boss 11 and the exhaust pipe for filtered oil or fluid will be threaded in the opening 12 in the base 6, there being a clear passage through the base 6 to the interior of the housing 1 in register with the threaded portions 11 and 12.

On the under face of the base 6 is the centrally apertured boss 13 in register with the boss 11 and having a conical bearing surface 14. Encircling this bearing surface is an annular screen 15 held on the boss 13 by the screws 16 and conventional lock washers and resting on shoulders 17 about its outer periphery so as to define an exhaust manifold 18 communicating with the exhaust opening 12.

The thin tubular spool 19 is inwardly flanged, the flange being curved as at 20 to seat on the surface 14 and is held in such seated position by the coil spring 21 which seats on the flat bottom of the can 1. Spot welded or otherwise permanently attached to the spool 19 are the flanged plates 22 and 23, whose outer diameter is slightly less than the inside diameter of the can 1. The lower end of the tube 19 is closed by the centrally apertured plug 24 which may be welded in place and additionally held by the cotter pin 25 as added support. The cotter pin interlocking with the spring 21 to prevent its loss when the can 1 is removed.

A filter bag 26 is open ended at 27, closed at 28. The bag may be woven or knitted as the case may be though preferably knitted as that avoids the presence of a seam at the open mouth of the bag. The open mouthed bag being bent back interiorly forms a selvage 29 so that it may be clamped to the spool.

As shown in FIGURES 2 and 3, the thin wall of the tube is oppositely indented as at 30 and 31. These indentations provide a flat surface for the gasket seating ring 32 which as will hereinafter appear, seats the gasket 33 on the side of the spool. In alignment with the indentations 30 and 31, spaced along the spool, are elongated apertures 34, 35 of such width that when the open mouth of the bag 27 is held against the gasket 33 by the ring 32, the apertures 34, 35 will be in register with apertures 36, 37, in the packing strip 33 and free flow of liquid through the apertures 34, 35, 36 and 37 from the interior of the tube 19 to the interior of the bag may occur.

The bag is held in register at its open mouth with the spool 19 by T-bolts 38 which extend radially through the tube 19 passing through the apertures 39 in the tube and the apertures 40 in the packing strip. Telltale pins 44 pass through the outer ends of the T-bolts after the screws, spring, and washers are assembled and these telltale pins are at right angles to the T of the T-bolt so that with the parts in the position shown in FIGURE 9, the open mouth of the bag may be slipped over the T-bolts, brought down against the washer. Then when the telltale pins are rotated into parallelism with the axis of the spool, the T-bolts will extend across and overhang the ring 32. Then when the nut 43 is tightened, the springs 41 will be compressed, the T-bolt will be drawn down to contact the ring 32, will cause the ring to compress the fabric of the bag directly against the washer so that a tight joint will be made about the entire periphery of the open bag mouth with the spool. When the packing strip 33 and bag mouth 27 are pressed into the indentations 31 and 30 of the spool, there will be a planar contact between the bag wall and the packing strip when the parts are in the position shown in FIGURE 8. Thus leakage between the spool and the bag will be obviated. The compressible packing washer between the tube 19 and the nut 43 fits the tube so that when pressure is applied, fluid flow through the apertures 39 around the T-bolts 38 will be prevented.

Then the bag and the spacing mat may be wound about the spool. The spool may be inserted in the can or housing 1, the bag and the mat being between the members 22 and 23. The housing may then be assembled, the spring 21 urging the upper end of the spool into fluid tight connection with its seat at 14.

45 is a pressure relief valve seat contained within the lower end of the spool 19. It will preferably be welded in place as indicated at 46. A pressure relief valve 47 is seated on the seat 45, held in seated position by the spring 48. When pressure is applied to the filter through the duct entering at 11, the fluid passes out through the ports 34, 35, 36 and 37 to fill the bag, expanding the bag against the mat so that both sides of the bag are free and unobstructed. The fluid passes through the bag into the space outside. It travels up along the mat around the disc 22 through the screen 15 to the manifold 18 and out at 12. If the pressure is excessive, it will overcome the spring 48 unseat the valve 47 and fluid will bypass the valve for escape at 12.

I claim:

1. A filter including a thin walled tube, having a substantially, uniformly circular cross section, longitudinally spaced semi-circular indentations in the wall thereof, the portion of said tube between said indentation being cylindrical a filter bag having an open mouth adapted to register with one side of the tube, the tube being apertured in register with such open mouth, a bag holding ring having parallel elongated legs joined at their ends by semi-circular loops, the distance between which is the same as the distance between the indentations, T-bolts extending radially through the tube, projecting into the open mouth of the bag and adapted to directly engage the legs of the ring and clamp the bag between the ring and the tube, the depth of the indentations being such that when the loops engage the indentations, the legs of the ring are in contact with the outer wall of the tube throughout their entire length and flanges permanently mounted on both ends of said tube, the distance between the flanges being greater than the width of the bag along the tube, said flanges extending outwardly a substantial distance from the walls of said tube, the cylindrical wall of the tube where it contacts the bag holding rim exerting a wedging action thereon.

2. A filter including a thin walled tube, having a substantially, uniformly circular cross section, longitudinally spaced semi-circular indentations in the wall thereof, the portion of said tube between said indentation being cylindrical a filter bag having an open mouth adapted to register with one side of the tube, the tube being apertured in register with such open mouth, bag holding ring having parallel elongated legs joined at their ends by semi-circular loops, the distance between which is the same as the distance between the indentations, the depth of the indentations being such that when the loops engage the indentations, the legs of the ring are in contact with the outer wall of the tube throughout their entire length the cylindrical wall of the tube where it contacts the bag holding rim exerting a wedging action thereon.

3. In combination, a thin walled metallic tube, having a substantially, uniformly circular cross section, longitudinally spaced arcuate indentations in the wall thereof, the portion of said tube between said indentation being cylindrical a bag holding planar ring having parallel elongated sides joined at their ends by semi-circular loops, the radii and the distance between which are the same as the radii and distance between the indentations, means for removably clamping the ring against the wall of the tube and the indentations therein to provide an uninterrupted planar contact between their opposed surfaces the cylindrical wall of the tube exerting a wedging effect on the clamping ring.

References Cited in the file of this patent

UNITED STATES PATENTS

| | | |
|---|---|---|
| 1,693,717 | Lienesch | Dec. 4, 1928 |
| 1,919,034 | Nugent | July 18, 1933 |
| 2,250,299 | Downing | July 22, 1941 |
| 2,478,109 | Kamrath | Aug. 2, 1949 |
| 2,626,057 | Clabaugh | Jan. 20, 1953 |
| 2,631,732 | Vocelka | Mar. 17, 1953 |
| 2,683,536 | Kasten | July 13, 1954 |
| 2,702,638 | Nugent | Feb. 22, 1955 |
| 2,963,162 | Shaw et al. | Dec. 6, 1960 |